2,864,702
Patented Dec. 16, 1958

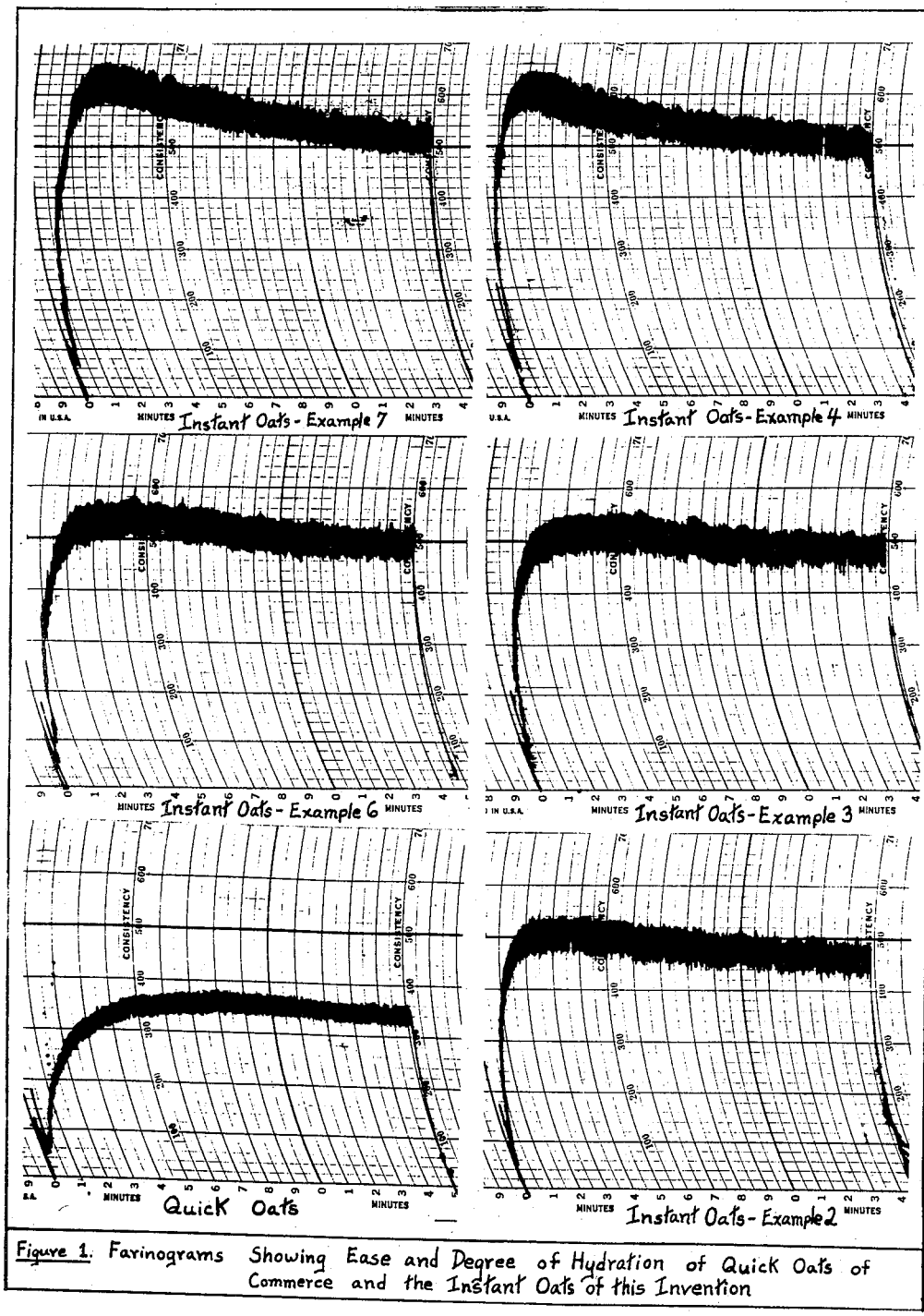
Figure 1. Farinograms Showing Ease and Degree of Hydration of Quick Oats of Commerce and the Instant Oats of this Invention

United States Patent Office

2,864,702

OAT CEREAL PRODUCT AND PROCESS FOR OBTAINING THE SAME

Harry A. Murray, Williamsville, and Edwin L. Sexton, Kenmore, N. Y., and Daniel Melnick, Teaneck, N. J., assignors to The Best Foods, Inc., New York, N. Y., a corporation of New Jersey Application June 28, 1954, Serial No. 439,622

4 Claims. (Cl. 99—80)

This invention relates to a novel instant oat product. The Instant Oats of this invention are defined as rolled oats or oat flakes of less than 15 percent moisture content, which hydrate in the bowl within 3 minutes following the addition of only boiling water to yield an oatmeal comparable in appearance, color, flavor and texture to oatmeal prepared from the "Quick Oats" of the prior art, which requires a cooking treatment. The product of the present invention will hereinafter be referred to as "Instant Oats."

Oatmeal is the most popular of the hot cereals. However, in many homes and in public dining places oatmeal is not served because considerable time is required for its preparation and the cooking pan is difficult to clean due to the viscous coating of the walls of the pan with gelatinized starch and coagulated protein. The products of the present invention eliminate completely these objections to the serving of oatmeal. By virtue of the present invention, it is now possible to prepare oatmeal in the home or elsewhere as readily as the cold ready-to-eat cereals and without a cooking treatment.

In the preparation of oats for human consumption, the grains are freed from other grains and unwanted material on separators, both sieve and disc type, with cyclones for dust removal, in accordance with common milling practice. The cleaned oats are dried to reduce the moisture content to about 6 to 8 percent and then tempered in bins for a period of 12 to 18 hours. The oats are then graded for size (diameter) so that the huller stones may be set for efficient hulling. After hulling, the bulk of the hulls are drawn off by suction and go to storage bins from where they are ultimately ground for an animal feed by-product. The resulting product, a mixture of hulled and unhulled oats, goes to the table machines whereon the two are separated by gravity; the hulled oats or whole groats are collected in bins, and the unhulled oats returned to the huller stones for further hulling. The whole groats, after the addition of water and steaming, may be flaked into the slow-cooking oat flakes of commerce which have been sold for many years. Such a product requires cooking for a period of 10 minutes or longer in a pan directly over the heating element of a cooking range prior to serving. The whole groats may be cut into from 8 to 12 pieces, called cut meal or steel-cut oats, and after adding water and steaming as for the whole groats, may be flaked into the quick-cooking oat flakes of commerce. These quick-cooking flakes are rolled thinner and require cooking for a period of about 3 minutes in a pan directly over the heating element of a cooking range. This process is described in greater detail by H. J. Brownlee and F. L. Gunderson, Cereal Chemistry, volume 15, pages 257–272 (1938). The quick-cooking oat flakes are believed to be among the most easily prepared of the oat flakes of the prior art and will be employed as a basis for comparison with the Instant Oats of the present invention in the specification below. For convenience, this product will be hereinafter referred to as "Quick Oats."

The cereal art has long sought an oat product which could be employed to prepare oatmeal without requiring cooking. Many attempts have been made to obtain such a product. Among such attempts are the pre-cooked oat cereals which are available today for infant feedings. Such products require the addition of hot water or milk to yield a fine uniform gruel, which bears little resemblance to conventional oatmeal in appearance, texture and mouthing qualities. The manufacture of such oatmeal products for infant feedings involves the preparation of coked oatmeal as a thin coarse suspension, comminuting the suspenion to reduce particle size, straining, drum-drying the fine suspension, and fracturing the dry film to obtain flakes of appropriate size. The shelf life of such products is greatly reduced because the oil or fat in the products becomes rancid. Rolled oats contain about 6 to 8 percent oil, fully 3 to 20 times greater than that of other cereals. The high iodine number of the oil, about 120, makes it readily susceptible to oxidation when exposed to air. Such exposure is provided in these oatmeal products designed for infant feedings for during the cooking oepration the oil is translocated from within the grain to the surface, coating the final flakes as a thin film. Such oatmeal products have a shelf life of only about 2 to 3 months before rancidity becomes organoleptically detectable.

Cereal technologists have gone to extremes in the attempt to obtain a pre-cooked oat cereal which would reconstitute rapidly in water without loss of flavor, palatability or granular identity. For illustrative purposes, reference is made to Carman et al. U. S. Patent No. 2,653,099 of September 22, 1953, which teaches a costly and complicated process to attain a quick-cooking oatmeal according to this process. Oat cut meal is cooked with steam under presusre; the cooked meal is exploded following instantaneous reduction of the pressure to well below atmospheric pressure; the expanded cereal is allowed to cold-set under reduced pressure; and the oat product is then rolled. Even here, however, an instant oatmeal is not obtained since cooking is required. The rolled oats are added to boiling water, and the suspension boiled or cooked over a flame for an additional minute. The addition of hot water alone to the rolled oats in a bowl gives an oatmeal raw in flavor and also unsatisfactory in other respects. The product of the Carman et al. patent is snow white in appearance, unlike normal oat flakes, and is readily susceptible to flavor deterioration during shelf life because of autoxidation of the oil coating the surface of the flakes. Shelf life of such an oat product is only about 2 to 3 months.

The principal objects of the present invention are:

(1) To provide the consumer with novel instant rolled oat products simulating in appearance the Quick Oats of commerce but which hydrate instantly in the bowl on the addition of boiling water to yield oatmeals comparable in appearance, color, flavor and texture to oatmeal prepared after a cooking treatment from the Quick Oats of commerce.

(2) To provide novel Instant Oat products which like the Quick Oats of commerce have an extended shelf life, from 1 to 2 years, without becoming rancid from the autoxidation of the oat oil contained therein.

(3) To provide a novel, economical method for the production of Instant Oats which makes use of existing manufacturing facilities and which does not require pre-cooking of the oats under steam or with added water to the point of complete gelatinization of the starch.

(4) To provide the consumer with a novel and rapid process for the preparation of oatmeal without use of a cooking pan.

Other objects will be apparent to those skilled in the art from reading the specification which follows.

Figure 1 of the drawings comprises Farinograms comparing the ease of hydration of Quick Oats and five Instant Oats products of the present invention and will be discussed in greater detail hereinbelow.

The present invention comprises novel instant rolled or flaked oat products (Instant Oats) which provide instant oatmeal without requiring a cooking treatment and which otherwise retain all of the desirable appearance, color, flavor, texture and storage stability of the Quick Oats of the prior art. The present invention also comprises a novel process for producing the Instant Oat products of the invention.

The Instant Oats of this invention are (a) from about 0.20 to 0.34 mm. in thickness, (b) of such size that at least 20 percent by weight of the flakes are retained over a #6 U. S. Standard Sieve with not more than 10 percent passing through a #20 U. S. Standard Sieve, and (c) of specific gravity of 0.14 to 0.28. The unhulled oats from which the Instant Oats are prepared are toasted for a period of 4 to 9 hours during which the temperature of the unhulled oats reaches from about 160° to 210° F., and are thereafter tempered by holding the hot oats at about this temperature in bins for about 14 to 20 hours prior to removal of the hulls, and rehydrated prior to flaking, with the end product containing from 9 to 13 percent moisture. On the addition of boiling water, the Instant Oats hydrate to characteristic eating quality in less than 3 minutes.

The preferred Instant Oats products of this invention are (a) from about 0.23 to 0.28 mm. in thickness, (b) of such size that about 30 to 40 percent by weight of the flakes are retained over a #6 U. S. Standard Sieve with not more than 8 percent passing through a #20 U. S. Standard Sieve, and (c) of specific gravity of 0.17 to 0.25. The unhulled oats from which the Instant Oats are prepared are toasted for a period of about 4 to 6 hours during which the temperature of the unhulled oats reaches from about 190° to 210° F., and are thereafter tempered in bins for about 16 to 18 hours prior to removal of the hulls, and rehydrated prior to flaking, with the end product containing from about 10 to 12 percent moisture. On the addition of boiling water, the preferred Instant Oats hydrate to characteristic eating quality in less than one minute and a half.

In contrast to the products of this invention, the Quick Oats of the prior art are about 0.60 mm. in thickness and have a specific gravity of about 0.32. In the preparation of Quick Oats, the oats are rapidly dried for a period of about 1 hour and thereafter tempered overnight prior to removal of the hulls. On the addition of boiling water, the Quick Oats fail to hydrate to characteristic eating quality even after 6 minutes. The particles fail to agglutinate due to inappreciable gelatinization of the starch but stay in suspension as discrete uncooked flakes in the added hot water. Temperature of the suspension of oats in the hot water progressively decreases, so that it falls well below desirable eating temperature on the addition of milk after the waiting period. Flavor of the oatmeal is that of a raw product. Thus, in appearance, in eating quality, and in flavor, the oatmeal prepared from the Quick Oats of commerce by steeping in hot water is totally unacceptable.

The novel process for the preparation of the Instant Oats of the present invention comprises, in general, the following treatments: The oat grains as harvested are separated from unwanted materials or cleaned in accordance with standard milling practice. The whole oats are then subjected to the important toasting treatment over pans exposed to the heat of free flames until the whole oats have reached a temperature of between about 160° and 210° F., and preferably between about 190° and 210° F. When the maximal temperature of the whole oats reaches between about 160° and 190° F., a period of at least 6 hours, and preferably 8 hours, will have elapsed for the toasting effect. When the maximal temperature of the whole oats reaches between about 190° and 210° F., a period of at least 4 hours, and preferably 5 hours, will have elapsed for the toasting effect. During this important stage of the treatment, only those whole oats in contact with the surface of the toasting pan are heated, and the surface of the pan is maintained at about 375° to 475° F., far in excess of the maximum temperature reached by the oat grains. During this toasting treatment the whole oats are continually agitated so as to prevent overheating of any particular grains.

Subsequent to the toasting period, the whole oats are promptly removed to wooden bins and tempered for about 14 to 20 hours, or preferably about 16 to 18 hours. The toasted and tempered whole oats are then graded for size (diameter) in accordance with the practice in the art and passed between huller stones to dehull the oats. The hulls are separated by suitable means and the hulled oats or whole groats may be optionally cut into cut meal or steel-cut oats to obtain advantages which will be explained hereinbelow. Next the oat particles are flaked or rolled to obtain the flakes of between about 0.20 and 0.34 mm. in thickness, and preferably about 0.23 to 0.28 mm. The resulting Instant Oats should also have a size such that at least about 20 percent, and preferably about 30 to 40 percent, are retained on a #6 U. S. Standard Sieve and not more than about 10 percent, and preferably not more than about 8 percent, shall pass through a #20 U. S. Standard Sieve. The final Instant Oats shall have a final moisture content of from about 9 to 13 percent, preferably from about 10 to 12 percent, and shall have a specific gravity of from about 0.14 to 0.28, and preferably from about 0.17 to 0.25.

The toasting and tempering treatments are two separate and distinct phenomena. Toasting involves a degree of surface charring or chemical reaction which results from close contact with a highly heated surface, and while this treatment will reduce the moisture content of the oats it is distinctly different than mere dehydration which also reduces the moisture content, but which produces no charring. It is this treatment which contributes heavily to the advantageous properties of Instant Oats. Tempering is also a necessary treatment but is distinguished from the toasting treatment in that no charring takes place. Tempering might be described as "fireless cooking."

Toasting and subsequent tempering of the hot oats for 14 to 20 hours, preferably in wooden bins, imparts two desirable effects to the Instant Oats. The toasted flavor is desirable and masks raw oat flavor in the oatmeal prepared from Instant Oats without cooking at the time of serving. Secondly, and even more important, the heat processing imparts structural strength to the flakes. This important discovery has made the Instant Oats of the present invention possible. Recognizing that the oats at the time of toasting and tempering are substantially dry products, one would not expect the heat processing to improve the structural strength of the resulting flakes. Gelatinization of starch and/or coagulation of proteins following the heating of dry foods, such as oats, containing 6 to 12 percent moisture would not be expected based upon food technology teachings. It has been concluded that some other factors, which we do not completely understand, must be responsible for the heat treatment to have imparted structural strength to the oat flakes, or that prior teachings are in error.

In accordance with the present invention various toasting periods ranging from 4 to 8 hours have been employed, with the whole oats reaching final temperatures ranging from about 160° to 210° F. Examples of such treatments are tabulated below (in all cases the hot toasted oats were subsequently tempered for 18 hours before dehulling). The properties of the Instant Oats prepared by these various toasting conditions will be described and compared with Quick Oats hereinbelow.

| Example | Toasting Time, Hours | Final Temperature of Oats, °F. |
|---------|----------------------|-------------------------------|
| 1       | 8                    | 180                           |
| 2       | 8                    | 175                           |
| 3       | 8                    | 175                           |
| 4       | 8                    | 175                           |
| 5       | 8                    | 175                           |
| 6       | 5                    | 210                           |
| 7       | 5                    | 210                           |
| 8       | 4                    | 200                           |
| 9       | 5                    | 210                           |
| 10      | 5                    | 210                           |
| 11      | 5                    | 210                           |

The Instant Oats of the present invention desirably simulate the Quick Oats of commerce in appearance and stability of the dry flakes and in texture and flavor of the cooked oatmeal. About 30 percent by weight of the Quick Oats are retained over a #6 U. S. Standard Sieve with about 5 percent passing through a #20 U. S. Standard Sieve. Such values are encompassed by the products of this invention. It has been discovered that the oat oil of the Instant Oats is as stable against oxidative deterioration as the oat oil of Quick Oats. Apparently there is not translocation of oil from within the grain to surface coating of the flakes as a result of the toasting of the oats and subsequent rolling. It must be concluded that cooking of oats in boiling water or under superheated steam is a requsite for translocation of the oat oil to the surface of the flake at which location the oat oil is readily susceptible to oxidation. Thus, the Instant Oats of this invention packaged under air still have a shelf life of 1 to 2 years before exhibiting an organoleptically detectable rancidity. In texture, flavor and nutritional value, the oatmeals prepared with the Instant Oats are comparable to that made with Quick Oats. The Instant Oats flakes readily absorb hot water and agglutinate as a result of the instantaneous gelatinization of the starch. The great advantages of Instant Oats over Quick Oats are ease of preparation of oatmeal from the Instant Oats and freedom from cleaning a cooking pan.

Cut meal prior to flaking for making Instant Oats has a size distribution rather than being nearly 100 percent one size. The ideal for shape and uniformity of flake is one size, or nearly so, but this may not be realized for economic reasons. To use only that which passes through a #12 U. S. Standard Sieve, but is retained over a #10 U. S. Standard Sieve, would require the discarding of greater amounts of unusable fines incidental to extra handling, as the coarser cut meal is repeatedly returned to the cutters for further reduction in size. Typical size distributions of cut meal found to be satisfactory are those shown in Table I below. Size distribution for cut meal shown in Batch 1 is characteristic of that employed in making Quick Oats of commerce. Size distribution approximating that of Batch 2 is preferred for the Instant Oats of this invention for it provides best results. Batch 3 provides a size distribution which is predominantly of smaller particles than is desirable.

TABLE I

*Size distribution of cut meal before flaking*

| U. S. Standard Sieve |        | Cut Meal, Percent |         |
|----------------------|--------|-------------------|---------|
|                      | Batch 1| Batch 2           | Batch 3 |
| Over #10             | 14.8   | 2.9               | 0.0     |
| #12                  | 54.6   | 43.6              | 14.4    |
| #14                  | 21.0   | 35.1              | 55.1    |
| #16                  | 6.5    | 12.8              | 22.0    |
| #18                  | 2.0    | 4.0               | 5.6     |
| #20                  | 0.8    | 1.1               | 1.9     |
| Through #20          | 0.3    | 0.5               | 1.0     |

Two methods for measuring flake thickness were employed in the research investigation leading to the discovery and characterization of the Instant Oat product of the present invention. In the first method, single flakes are arranged on a glass plate, another glass plate is placed on top, and the thickness of the plates and the layer of oat flakes measured with a micrometer. After subtracting the thickness of the glass plates, the thickness of the flakes are obtained. The precision of the measurements of flake thickness is ±0.013 mm. The second method involves direct microscopic measurement of flake thickness using a micrometer eyepiece. The individual oat flakes are mounted for this purpose in a vertical position on a bed of finely-divided carbon. The optical method has been employed for confirmatory purposes and usually gives values agreeing to within ±0.02 mm. with those obtained by the glass plate method. For both measurements flat flakes with the least surface irregularity are employed.

Flake size has been established by placing 100 grams of oat flakes on the top of a nest of three U. S. Standard Sieves, #6, #8 and #20. This assembly is placed on top of the Ro-Tap machine (manufactured by W. S. Tyler Company, Cleveland, Ohio) and shaken for a period of one minute. At the end of this period the amounts of material remaining on the #6 Sieve and passing through the #20 Sieve are weighed. When the accumulated percentage over a given sieve (a larger series employed) is plotted on probability paper against the opening on that sieve, a straight line is obtained. The sieve opening corresponding to the midpoint of this distribution corresponds to the average flake size. The data in Table II below have been obtained for a number of the Instant Oat products of the present invention. For comparative purposes the results obtained with Quick Oats of commerce are also tabulated.

TABLE II

*Flakes size of Quick Oats and of Instant Oats*

| Cut Meal Size [1] | Oat Flakes |         | Thickness of Flake, mm. | Retained Over #6 Sieve,[2] Percent | Passed Through #20 Sieve,[2] Percent | Average Flake Size,[2] mm. |
|-------------------|------------|---------|-------------------------|------------------------------------|--------------------------------------|----------------------------|
|                   | Identity   | Example |                         |                                    |                                      |                            |
| Batch 1           | Quick      |         | 0.61                    | 31.8                               | 5.0                                  | 2.80                       |
|                   | Instant    | 1       | 0.28                    | 46.2                               | 5.5                                  | 3.35                       |
|                   | Instant    | 2       | 0.34                    | 30.6                               | 3.1                                  | 2.83                       |
| Batch 2           | do         | 3       | 0.28                    | 36.6                               | 3.7                                  | 2.95                       |
|                   | do         | 4       | 0.23                    | 36.0                               | 6.1                                  | 2.90                       |
|                   | do         | 5       | 0.20                    | 41.0                               | 8.4                                  | 3.07                       |
|                   | do         | 6       | 0.28                    | 31.2                               | 2.8                                  | 2.85                       |
|                   | do         | 7       | 0.23                    | 38.9                               | 4.5                                  | 2.95                       |
|                   | do         | 8       | 0.21                    | 42.3                               | 5.9                                  | 3.05                       |
| Batch 3           | Instant    | 9       | 0.33                    | 20.2                               | 6.4                                  | 2.45                       |
|                   | do         | 10      | 0.26                    | 23.4                               | 7.1                                  | 2.62                       |
|                   | do         | 11      | 0.21                    | 25.7                               | 8.0                                  | 2.70                       |

[1] See Table I.
[2] After one minute of shaking (see text above).

It will be noted as the particle size of the cut meal is reduced, the size of the flakes of comparable thickness is reduced (compare the quantity of flakes retained on the #6 Sieve in the case of Examples 1, 3 and 10). Cut meal of the size characterized by Batch 2 (see Table I) makes flakes of the most desirable size. As the cut meal of a given size distribution is rolled thinner, the quantity of flakes by weight retained over the #6 Sieve is increased (compare the quantity of flakes retained on the #6 Sieve in the case of Examples 2–5). This and that noted in the preceding sentences are expected findings. However, the quantity of fines (that passing through the #20 Sieve) is not significantly increased as a result of thinner flaking. It is not possible to detect by visual inspection an increase of fines up to 5 percent by weight.

This resistance of the thin flakes of the present invention, flakes of 0.20 to 0.34 mm. in thickness, preferably 0.23 to 0.28 mm., to breakage is one of the features of the present invention. The concept held by oat milling technologists (see S. F. Brockington, Food Technology, volume 4, pages 396–400 [1950]), that it is not possible to market an oat flake thinner than that characteristic of the Quick Oats of commerce, has led others (as discussed earlier) to resort to extended cooking of oats in water or under superheated steam in order to obtain an oat flake which requires no cooking. The oat grains used by others in making conventional oat flakes are not toasted for prolonged periods over pans, subjected to the direct heat of a free flame, prior to removal of the hulls. Instead the oat grains are rapidly dehydrated for a period of only one hour. Flakes from oats so processed cannot be used to make the Instant Oats of the present invention; they are much too fragile for packaging and shipment. In addition, the products from untoasted flakes lack flavor, so that oatmeals prepared by adding boiling water to the flakes in the bowl taste raw.

Because of the prior teaching by oat milling technologists (see Brockington, supra) emphasizing the fragility of thin flakes, cases of the products of this invention were packaged in the usual manner and then shipped 1,000 miles across country by truck to determine their fragility. The specific gravities of the Instant Oat products were determined as the flakes were produced by the rolls and after receipt in packaged form 1,000 miles away. For this determination each product was transferred into a standard measuring cup (237 ml.) by means of a tablespoon until it overflowed. The excess product was removed by drawing a straight edge blade across the top of the cup. The cup was not shaken or tapped during the measurement. All values for cup weight given in Table III below represent the average of three determinations and the precision was ±0.3 grams. Specific gravity values were obtained by dividing cup weight by 237 grams.

TABLE III

*Change in specific gravity of flakes as a result of packaging and shipment [1]*

| Cut Meal Size [2] | Oat Flakes | | Thickness of Flake, mm. | As Produced | | After Shipment | |
|---|---|---|---|---|---|---|---|
| | Identity | Example | | Cup Weight gm. | Specific Gravity | Cup Weight, gm. | Specific Gravity |
| Batch 1 | Quick | | 0.61 | 74 | 0.312 | 77 | 0.325 |
| | Instant | 1 | 0.28 | 47 | 0.198 | 57 | 0.241 |
| | Instant | 2 | 0.34 | 52 | 0.219 | 61 | 0.257 |
| | do | 3 | 0.28 | 44 | 0.186 | 55 | 0.232 |
| | do | 4 | 0.23 | 40 | 0.169 | 52 | 0.219 |
| Batch 2 | do | 5 | 0.20 | 36 | 0.152 | 48 | 0.202 |
| | do | 6 | 0.28 | 53 | 0.224 | 58 | 0.245 |
| | do | 7 | 0.23 | 45 | 0.190 | 50 | 0.211 |
| | do | 8 | 0.21 | 41 | 0.173 | 50 | 0.211 |
| | Instant | 9 | 0.33 | 47 | 0.198 | 53 | 0.224 |
| Batch 3 | do | 10 | 0.26 | 44 | 0.186 | 50 | 0.211 |
| | do | 11 | 0.21 | 40 | 0.169 | 47 | 0.198 |

[1] By truck, 1,000 miles across country.  [2] See Table I.

It will be noted from the data in Table III that cup weights and specific gravity values for flakes, made with cut meal of a given size distribution, decreased as the flakes were rolled thinner. When the tests were conducted on the products after shipment these values were appreciably greater. It might have been concluded by some that the products were too fragile to be marketed. Fines (oat flour), for example, have a cup weight value of 97 grams (specific gravity of 0.41) which is far greater than that of the flakes. There is no question that rubbing the Instant Oat flakes of the present invention between the fingers reduces these products to a powder much more easily than the Quick Oats of commerce. And yet, the products as received were highly acceptable in appearance.

To resolve this seemingly paradoxical situation, control bumping and abrasion tests, which will be described hereinbelow, were conducted. The test products of the present invention, as well as the Quick Oats of the prior art, were retested according to the same method described above in connection with Table II for measuring flake size but this time the shaking period was extended to 5 minutes. The amounts of material remaining on the #6 Sieve and passing through the #20 Sieve were weighed. Based upon the results obtained with the Quick Oats of the prior art, it can be stated that this bumping and abrasion test is so severe that it would encompass all mishandling of oat flakes in the trade or home for a period of two years after production. The results are shown in Table IV below:

TABLE IV

*Fragility of Quick Oats and Instant Oats*

| Cut Meal Size [1] | Oat Flakes | | Thickness of Flake, mm. | Retained Over #6 Sieve | | Passed Through #20 Sieve | |
|---|---|---|---|---|---|---|---|
| | Identity | Example | | Initial,[2] Percent | Abused,[3] Percent | Initial,[2] Percent | Abused,[3] Percent |
| Batch 1 | Quick | | 0.61 | 31.8 | 21.5 | 5.0 | 6.5 |
| | Instant | 1 | 0.28 | 46.2 | 26.4 | 5.5 | 7.5 |
| | Instant | 2 | 0.34 | 30.6 | 18.0 | 3.1 | 5.7 |
| | do | 3 | 0.28 | 36.6 | 21.9 | 3.7 | 6.2 |
| | do | 4 | 0.23 | 36.0 | 22.7 | 6.1 | 8.9 |
| Batch 2 | do | 5 | 0.20 | 41.0 | 24.9 | 8.4 | 11.8 |
| | do | 6 | 0.28 | 31.2 | 21.2 | 2.8 | 4.8 |
| | do | 7 | 0.23 | 38.9 | 27.0 | 4.5 | 6.8 |
| | do | 8 | 0.21 | 42.3 | 28.8 | 5.9 | 8.7 |
| | Instant | 9 | 0.33 | 20.2 | 12.7 | 6.4 | 8.9 |
| Batch 3 | do | 10 | 0.26 | 23.4 | 14.8 | 7.1 | 10.0 |
| | do | 11 | 0.21 | 25.7 | 15.8 | 8.0 | 11.5 |

[1] See Table I.  [2] After 1 minute of shaking.  [3] After five minutes of shaking.

The results of the bumping and abrasion tests, summarized in Table IV above, indicate that the absolute loss of flakes over the #6 Sieve becomes greater as the flake thickness is reduced. However, as the oat flakes are rolled thinner, flake size increases with the result that a satisfactory quantity of large flakes still remain on the #6 Sieve. Indeed, the absolute retention of large flakes in the case of many of the Instant Oats of this invention is greater than that noted with the Quick Oats of the prior art. The values obtained with the Instant Oats of Examples 1, 3, 4, 5, 7 and 8 in comparison with those for the Quick Oats support the above statements. The results obtained with Examples 9–11 are attributed to the use of cut meal of other than that having the preferred size distribution; absolute flake disintegration is not excessive, but quantity initially present is low due to the original smaller particle sizes. The highly satisfactory results obtained with Examples 6 and 7 are related to the method of processing and these results will be discussed later in this specification. Oat fines, the material which passes through a #20 Sieve, increase somewhat in quantity as the absolute degradation of the large flakes increase, but these increases are of a negligible order of magnitude. Apparently oat flake degradation to particles of somewhat smaller size but not to fines occurs. It is our hypothesis that the surprising resistance of the Instant Oat flakes of the present invention to fracture during the test (and during packaging and shipment) is in part related to the lower specific gravity of these flakes (see Table III above); the flakes are subjected to a much smaller abrasive force. When the abrasive force is maintained relatively the same, such as occurs in rubbing the flakes between the fingers under constant pressure, the Instant Oat flakes are definitely more readily reduced to a powder. However, such conditions do not obtain in packaging, shipment or use of the Instant Oats of this invention. It is to be emphasized that the flakes of large dimension in proper concentration, viz., above 20 percent by weight, characterize oat products for human consumption and in this regard the Instant Oats of the present invention are highly satisfactory.

The Instant Oats of this invention have been characterized as products which hydrate in the bowl within a period of 3 minutes, and preferably within a period of 1½ minutes following the addition of boiling water. Objective methods are employed for measuring rate of hydration. For this purpose the Brabender farinograph is employed. This instrument and its applicability to the measurement of flour dough consistency is described by E. J. Pyler in Baking Science and Technology, volume II, pages 511–516 (1952), published by Siebel Publishing Company, Chicago, Ill. The force required to rotate the paddle blades, operating at constant speed, through a dough is periodically recorded to obtain the farinogram. In the farinograph bowl at 40° C. are added 150 grams of the oat products followed by 225 ml. of boiling water and the farinogram taken. The mixer is operated at 30 R. P. M. during the first 30 seconds required for the addition of the water and at 60 R. P. M. thereafter. The instrument is employed at the least sensitive setting. In another type of test a weighed quantity of oat flakes is placed in the mixing bowl, and a predetermined amount of boiling water is added to give a farinograph consistency of 500 units for each mixture. In Table V below are listed the results of both types of farinograph tests and of subjective tests for determining the rate and degree of hydration of the Quick Oats of the prior art and a number of representative Instant Oats of this invention:

TABLE V

Rate and degree of hydration of Quick Oats and of Instant Oats[1] following the addition of boiling water

| Oat Flakes | | Thickness of Flake, mm. | Time Required For Good Eating Quality of Hydrated Flakes,[2] min. | Farinograph Evaluations | | | |
|---|---|---|---|---|---|---|---|
| | | | | Fixed Oat: Water Ratio[3] | | Consistency Fixed at 500 Units | |
| Identity | Example | | | Maximum Consistency, Units | Time Required, min. | Oat: Water Ratio | Time Required, min. |
| Quick | | 0.61 | not attainable | 355 | 5.5 | 0.81 | 5.0 |
| Instant | 2 | 0.34 | 3.0 | 505 | 2.5 | 0.68 | 2.5 |
| | 3 | 0.28 | 1.5 | 515 | 2.5 | 0.66 | 2.5 |
| | 4 | 0.23 | 0.5 | 610 | 1.75 | 0.62 | 1.5 |
| Instant | 6 | 0.28 | 1.5 | 545 | 2.5 | 0.65 | 2.5 |
| | 7 | 0.23 | 0.5 | 630 | 2.0 | 0.61 | 1.25 |

[1] All samples made from cut meal from Batch 2. The results with the other Instant Oat products were comparable for flakes of comparable thickness.
[2] After the minimum time required for hydration in the bowl of 25 grams of product with one-half cup of boiling water, cold milk was added and the oatmeal eaten.
[3] As shown in Figure 1 of the drawings.

These tests demonstrate that the Quick Oats of the prior art fail completely to hydrate to satisfactory eating quality when boiling water is added to the flakes in the bowl. The particles remain of firm texture and fail to agglutinate on standing. Three mintes of steeping in the hot water are required for the hydration of the Instant Oats of Example 2, while the oats of Examples 3 and 6 require 1.5 minutes, and those of Examples 4 and 7 require 0.5 minute. The other Instant Oats described in this specification require comparable times for flakes of comparable thickness. The objective farinograph results shown in Figure 1 of the drawings are in excellent agreement with the subjective taste evaluations. A consistency value of 500 units must be attained in a period of less than 3 minutes for the oat flakes to hydrate properly when steeped in hot water. Increasing the ratio of the prior art Quick Oats to water will increase the consistency value, but this will not make for a product of acceptable eating quality.

The farinograms shown in Figure 1 of the drawings picture in full objective results obtained and tabulated in Table V above.

In preparing oatmeals from the Instant Oats of the present invention for evaluation by flavor panels, the following standardized procedure has been employed. To 25 grams (about ½ cup) of the oat flakes in a bowl at room temperature are added one-half cup of boiling water (118 grams). This is followed by an eighth teaspoonful of salt (0.6 gram) and two teaspoonsful of sugar (10 grams). One-fourth cup of cold (50° F.) milk or cream (60 grams) is then added to complete the oatmeal. Of course, such precision in oatmeal preparation is not expected in the home. The method of preparation under practical conditions of use in the home is very simple, viz., a bowl is filled about one-fourth full with Instant Oats, boiling water is added from the kettle with stirring to cover completely the oats, a double pinch of salt is stirred in, sugar is added to taste, followed by cold milk or cream, and then the oatmeal is served.

In Table VI below are presented temperature changes which occur in preparing oatmeal by the standardized instant process described hereinabove:

TABLE VI

*Temperature changes in preparing oatmeals by the instant method [1]*

| Oat Flakes | | | Preparation of Mixtures | | | |
|---|---|---|---|---|---|---|
| Identity | Example | Thickness of Flake, mm. | Flakes+ Water,[2] °F. | After Steeping [3] | | Eating Temperature,[4] °F. |
| | | | | Time, min. | Prior to Milk, °F. | |
| Quick | | 0.61 | 190 | 6.0 | 134 | 105 |
| Instant | 2 | 0.34 | 185 | 3.0 | 154 | 118 |
| | 3 | 0.28 | 192 | 1.5 | 165 | 135 |
| | 4 | 0.23 | 185 | 0.5 | 175 | 150 |
| Instant | 6 | 0.28 | 193 | 1.5 | 167 | 138 |
| | 7 | 0.23 | 190 | 0.5 | 176 | 152 |

[1] The mixtures were well stirred to obtain uniformity, each time when temperature readings were made.
[2] Immediately after adding 118 grams of boiling water to 25 grams of flakes in a bowl at room temperature.
[3] Overall time during which salt and sugar were added.
[4] Immediately after adding 60 grams of milk at 50° F.

The oatmeal, prepared from the Quick Oats of commerce, is totally unsatisfactory not only in texture and eating quality but also in eating temperature as a result of the extended steeping time in the hot water. Even after the 6 minutes' steeping time, these oat flakes were poorly hydrated. Instant Oats of the present invention, such as those in Example 2, require 3 minutes' steeping time. The resulting oatmeal simulates that prepared with the Quick Oats, cooked by the conventional methods; an eating temperature of 118° F. was just satisfactory. The preferred Instant Oats of this invention (viz., Examples 3, 4, 6 and 7) hydrate within a period of 1½ minutes or less to yield oatmeals of good eating quality and of good eating temperatures. In general speed and degree of hydration in hot water is inversely related to flake thickness.

Examination of the data in Table II hereinabove will show that the Instant Oats of Examples 6 and 7 are superior to those of Examples 3 and 4, respectively, in furnishing oat flakes with less fines (that passing through the #20 sieve). What is more striking are the smaller increments in cup weights and specific gravity resulting from packaging and shipping the Instant Oats of Examples 6 and 7 (see Table III above), relative to increments obtained with the other Instant Oats. Confirmation of the greater resistance of the toasted and tempered oat flakes to breakage may be found in Table IV above; viz., compare results obtained with the Instant Oats of Examples 6 and 7 with those obtained with the Instant Oats of Examples 1–5 for retention of large flakes and for development of fines. The results with Examples 9–11 also support the discovery that toasting followed by tempering imparts to the flakes greater resistance to breakage, but this is not so obvious because of the smaller size cut meal employed in making Examples 9–11. The farinograms in Figure 1 of the drawings indicate that toasting has contributed very little to ease of hydration in preparing the oatmeal. This would indicate that little significant gelatinization of the starch has occurred as a result of extending the toasting operation.

Despite the rolling of the Instant Oat flakes of the present invention to the desired degrees of thickness, defined hereinabove, flavor stability of the Instant Oats remains equal to that of the Quick Oats of the prior art. In the processing of oil-bearing seeds or legumes to obtain the oil, hydraulic or expeller processing techniques are employed. In principle, such processing is equivalent to the passing of oat cut meal through the rolls under high pressure. There is no question that in treating the oil-bearing seeds or legumes, translocation of the oil to the surface occurs, for that is how the oil is collected. However, it was discovered that no such translocation occurs in the rolling of the oat cut meal. As mentioned hereinabove, cooking in water or under superheated steam is required for this effect to be noted in oats. Thus, the Instant Oats of this invention have no surface oil film and hence are resistant to oxidative deterioration.

Each example number referred to in each of the tables in the present specification represents a single product and is that which is prepared in accordance with the table on page 10 of the present specification.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

What is claimed is:

1. The process of making a toasted oat flake product which is capable of producing oatmeal upon the addition of boiling water and without any cooking treatment, which process comprises toasting unhulled oats for a period of about 4 to 9 hours until the unhulled oats reach a temperature of between about 160° and 210° F., tempering the hot oats at approximately this temperature for a period of about 14 to 20 hours, removing the hulls, cutting the groats of the oats to yield cut meal of such a size distribution that more than 90 percent is retained over a #16 U. S. Standard Sieve, restoring the moisture content, and rolling to a flake thickness of 0.20 to 0.34 mm., with the moisture content of the end product being about 9 to 13 percent.

2. The process of making a toasted oat flake product which is capable of producing oatmeal upon the addition of boiling water and without any cooking treatment, which process comprises toasting unhulled oats for a period of about 4 to 6 hours to a product temperature of between about 190° to 210° F., tempering the hot oats at approximately this temperature for about 16 to 18 hours, removing the hulls, cutting the groats to yield cut meal of such a size distribution that 75 to 85 percent is retained over a #14 U. S. Standard Sieve, restoring the moisture content, and rolling to a flake thickness of 0.23 to 0.28 mm., with the moisture content of the end product being about 10 to 12 percent.

3. A toasted oat flake being substantially non-gelatinized and resistant to oxidative deterioration which is prepared by the process of claim 1.

4. A toasted oat flake being substantially non-gelatinized and resistant to oxidative deterioration which is prepared by the process of claim 2.

References Cited in the file of this patent

UNITED STATES PATENTS

| 1,034,169 | Valentine | July 30, 1912 |
| 1,393,997 | Friedman | Oct. 18, 1921 |
| 1,552,531 | Meyers | Jan. 13, 1925 |
| 2,554,873 | Musher | May 29, 1951 |
| 2,653,099 | Carman et al. | Sept. 22, 1953 |

UNITED STATES PATENT OFFICE
CERTIFICATE OF CORRECTION

Patent No. 2,864,702

December 16, 1958

Harry A. Murray et al.

It is hereby certified that error appears in the printed specification of the above numbered patent requiring correction and that the said Letters Patent should read as corrected below.

Column 2, line 12, for "coked" read -- cooked --; line 23, for "oepration" read -- operation --; line 36, for "presusre" read -- pressure --; column 5, line 27, for "not" read -- no --; column 6, lines 3 and 34, column 7, line 48, column 8, line 38, column 9, lines 51 and 58, columns 9 and 10, TABLE V, first line of the footnote thereto, and column 12, line 1, for "Oat", each occurrence read -- Oats --; column 9, lines 2 and 7, the word "absolute" should be italicized, each occurrence; column 10, line 46, for "mintes" read -- minutes column 12, list of references cited, under the heading "UNITED STATES PATENTS", for the patent number "1,552,531" read -- 1,522,531 --.

Signed and sealed this 25th day of August 1959.

(SEAL)
Attest:

KARL H. AXLINE
Attesting Officer

ROBERT C. WATSON
Commissioner of Patents